United States Patent [19]

Dahlgren

[11] Patent Number: 5,042,896
[45] Date of Patent: Aug. 27, 1991

[54] POLARIZATION DEVICE

[75] Inventor: Robert P. Dahlgren, Somerville, Mass.

[73] Assignee: The Charles Stark Draper Laboratory, Inc., Cambridge, Mass.

[21] Appl. No.: 575,318

[22] Filed: Aug. 30, 1990

[51] Int. Cl.[5] ............................................... G02B 6/26
[52] U.S. Cl. ........................................ 385/31; 385/126
[58] Field of Search ................. 350/96.15, 96.16, 96.33

[56] References Cited

U.S. PATENT DOCUMENTS

| 4,386,822 | 1/1983 | Bergh | 350/96.15 |
|---|---|---|---|
| 4,652,079 | 3/1987 | Shaw et al. | 350/96.15 |
| 4,753,497 | 6/1988 | Fujii et al. | 350/96.15 |
| 4,859,016 | 8/1989 | Shaw et al. | 350/96.15 |
| 4,895,422 | 1/1990 | Rand et al. | 350/96.15 |
| 4,906,068 | 3/1990 | Olson et al. | 350/96.15 X |

OTHER PUBLICATIONS

"Indium-Coated D-Shaped-Fiber Polarizer", R. B. Dyott, et al., Optics Letters, Apr. 1987 vol. 12 No. 4.
"Optical-Fibre Surface-Plasmon-Wave Polarisers With Enhanced Performance", M. N. Zervas, et al., Electronics Letters, 2nd Mar. 1989, vol. 25, No. 5.
"Indium Sealing Techniques", U. Hochuli et al., The Review of Schentific Instruments, vol. 43, No. 8, Aug. 1972.
"Theoretical Study of Metal-Clad Optical Waveguide Polarizer", Yu Tong et al., IEEE Journal of Quantum Electronics, vol. 25, No. 6, Jun. 1989.
"Relative Transmission Loss of TE- and Tm-Like Modes in Metal-Coated Coupler Halves", A Kumar, Electronics Letters, 2nd Mar. 1989, vol. 25, No. 5.
"Perturbation Analysis of Polarization Splitting Direction Couplers", Supriya Diggavi, et al., Applied Optics/ vol. 28, No. 15/15 Aug. 1989.
"Design and Analysis of a Novel Polarisation Splitting Directional Coupler", K. Thyagarajan et al., Electronics Letter, 7th Jul. 1988, vol. 24, No. 14.
"Single-Mode Fiber Optic Polarizer", R. A. Bergh et al., Optics Letters, vol. 5, No. 11, pp. 479-481 (Nov. 1980).

Primary Examiner—William L. Sikes
Assistant Examiner—Phan T. Heartney
Attorney, Agent, or Firm—Lahive & Cockfield

[57] ABSTRACT

An optical element includes a polarization maintaining fiber, and an Indium film on a lapped region of the fiber that selectively couples light of one polarization out of the fiber. The film bonds to a coupling half block or cover plate, providing an hermetic seal about the fiber coupling region. Polarizers, polarizing couplers, polarization beamsplitters, and single mode resonant fiber ring constructions are described.

12 Claims, 3 Drawing Sheets

POLARIZATION DEVICE

BACKGROUND OF THE INVENTION

The present invention relates to polarizers, to polarizing couplers and to polarization beamsplitting couplers for fiber optic applications. It also relates to fiber optic instrumentation, such as single channel fiber optic ring resonators, which utilize a polarized light signal.

Prior art fiber couplers employing lapped coupling blocks have involved constructions utilizing an index-matching material, such as an oil or a bonding agent, between the blocks, or utilizing optical contact bonding of the lapped regions of the fibers.

These constructions all suffer from varying degrees of instability and environmental sensitivity, usually experienced as a coupling ratio shift of the coupler. The refractive index of the coupler index-matching oil, and the fixtures generally employed for maintaining the coupler/core alignment are highly temperature sensitive. The index oil has tendency to dry out, is susceptible to solvent or water absorption and may adversely affect the adhesive which secures the fiber in the coupling block. Index-matched UV curable adhesives allow coupling ratio adjustment on initial set-up, and they cure on demand, but they also have high temperature coefficients of refractive index, although lower than those of index matching oils. Environmental issues such as lifetime, aging parameters and susceptibility to water absorption are unknown for this type of bonding. The alternative approach of optical contact bonding places extreme demands on the coupler polishing flatness and on assembly techniques. In addition, the optical contact bonding process is usually irreversible, making it impossible to effect later compensating adjustments for the inevitable splitting ratio drift after assembly and aging. Optical contact bonded couplers are also sensitive to thermal gradients, and cannot be used for fabricating polarization beamsplitting couplers or for joining dissimilar materials.

Polarization beamsplitting couplers have been fabricated by applying Aluminum thin films having a complex index of refraction of $n = 1.20 - 7.0i$ at 633 nm to the lapped coupling region of a fiber in a coupling block, and joining it to an opposed coupling block using a suitable index-matching oil. A dielectric or second metal layer is sometimes deposited over the Aluminum film to enhance the plasmon effect responsible for polarization beamsplitting. Using these techniques, over 30 dB isolation with 1 dB excess loss have been obtained, and it is possible to obtain complete transmission of one polarization while completely rejecting the other polarization. Polarizers have also been demonstrated using similar techniques involving depositing thin Aluminum or other films on the exposed fiber coupling region of a single coupler half. These constructions suffer from instability due to environmental exposure. The polarization beamsplitting couplers using similar metal film technology have only been demonstrated using matched index oils or possibly matched index bonding agents, constructions which both result in marked dependence on environmental conditions, and in instability. Thin-film polarizers have an exposed thin film of a metal such as Aluminum, which can oxidize if not sealed.

It is therefore desirable to provide a simple, rugged and effective construction for fabricating polarizing elements.

SUMMARY OF INVENTION

In accordance with the present invention, a polarization-maintaining half coupler is lapped to expose a region of a first fiber close to the core, and a metal film which wets to the coupling block is then deposited on the exposed region. When it is desired to make a polarizer, a sealant, cover slip, or birefringent cover is then placed over the metal film and sealed to the half-coupler by the metal film. When it is desired to make a polarization beamsplitter, a second fiber in a similarly-lapped half-coupler is placed over the coupling region, with the metal film serving to bond the two together in a structure and also to selectively couple light of one polarization from the first fiber to the second fiber. The metal film is preferably formed of Indium, which has a complex index of refraction; and may be deposited by an evaporation, sputtering, or other deposition process. The metal layer is preferably 50–500 Angstroms thick, with the thickness selected such that the composite core/metal layer/core waveguide structure has the desired performance, i.e., has the desired levels of transmission and reflection.

BRIEF DESCRIPTION OF THE DRAWINGS

These and other desirable features of the invention will be understood from the description herein and illustration of representative embodiments, wherein.

DETAILED DESCRIPTION OF THE INVENTION

The invention is best understood from a description of the fabrication process for a polarizer in accordance with a first basic embodiment.

Figure 1A:
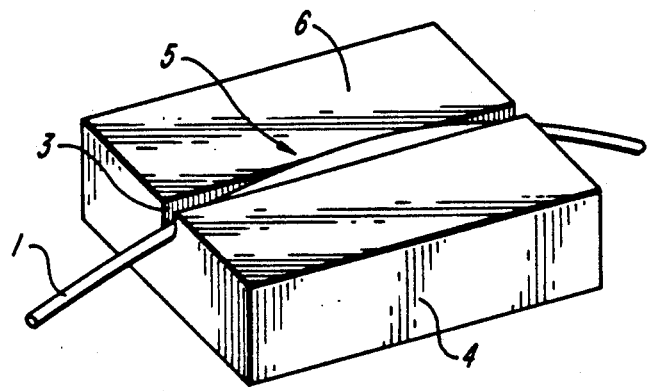
FIGS. 1A–1C show steps in fabricating a polarizing element according to the present invention.
Figure 1B:
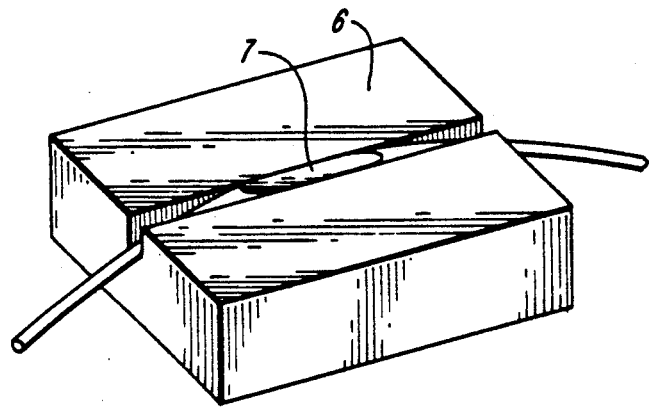

A polarization maintaining (PM) fiber 1 is stripped of its jacket and is affixed with adhesive to an arcuate groove 3 of a radius "r" in a substrate block 4 as shown in FIG. 1A so that the fiber rises to approximately the level of, or just below, the block surface 6 in a central region 5. Next, as shown in FIG. 1B, Surface 6 is lapped to remove an outer portion of the fiber cladding in a surrounding coupling region 7. Region 7 is a generally elliptical flat face of the worked fiber, at a height sufficiently close to the fiber core—a fraction of a micron to ten microns—such that evanescent wave energy of guided light in the core may be coupled out of the fiber through region 7. The lapping depth may be ascertained by monitoring the intensity of a signal propagated through the fiber at different lapping stages while the fiber coupling region is immersed in different refractive index oils. Thus far, the fiber bonding, lapping and monitoring operations are identical to the corresponding steps commonly employed in the fabrication of lapped couplers.

The fiber itself is aligned such that one of its principal axes is aligned parallel to the lapped surface which will receive a metal film, as described below. Depending on the fiber properties and film dimensions, this axis may be either the fast or slow axis of the fiber. During lapping, care must be taken to prevent excessive generation of heat or mechanical forces that may degrade the stress field in the fiber responsible for its polarization maintaining property.

Once the fiber, and preferably also a surrounding portion of the support block, has been lapped optically flat, a thin coating 8 (FIG. 1C) of Indium, which wets to glass is applied over the lapped surface by sputtering, evaporation, electron beam deposition or the like in a thickness effective to provide a boundary condition which effectively allows coupling of light of only one polarization from the fiber. The complex index of refraction of Indium has been to be 2.31-11.3i at 1.55 microns, and the film thickness necessary to achieve selective transmission of one polarization is expected to be between approximately 50 to 500 Angstroms, with the actual required thickness varying depending on the block groove radius, core-to-surface spacing in the fiber lapped region 7, and interaction length. The level of surface roughness and degree of cleanliness required are consistent with the level required in conventional low-loss lapped coupler fabrication, but the surface flatness requirement may be relaxed somewhat due to the surface smoothing effect of the metal film. For calculation of an optimal coating thickness, reference is made to the theoretical models of metal clad waveguide polarizers, such as the analyses of Tong et al, in *IEE J. Ouant. Elec.* Vol. 25 No. 6, p. 1209 (June, 1985) and of Kumar et al. in Elect. Letters Vol. 25 No. 5 p. 301.

Figure 1C:
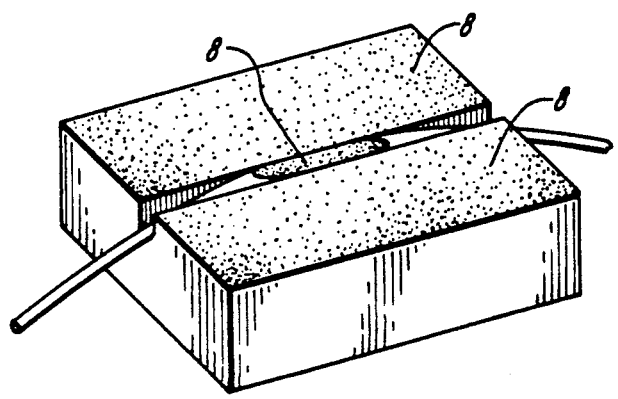
Figure 5A:
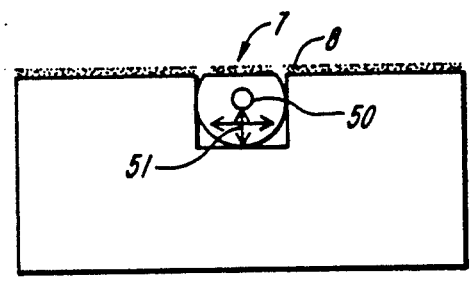
FIGS. 5A–5C show sections through the mounted lapped fibers of different embodiments.

FIG. 5A shows a cross-section taken vertically through the finished block of FIG. 1C in the central coupling region 7 of the fiber. Film 8 is deposited on a surface lapped to pass closely to the fiber core 50. A pair of crossed arrows 51 indicate the orientation of the principal axes of the fiber in relation to the lapped surface.

Figure 2:
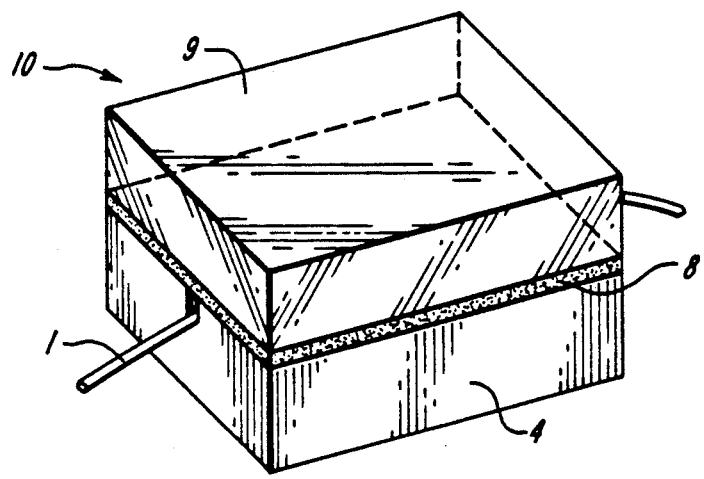
FIG. 2 shows a polarizer fabricated in accordance with another embodiment of the invention.

FIG. 2 shows a completed polarizer 10 made with the prepared metal clad assembly of FIG. 1C. A cover plate 9 has been added on top of film 8.

Plate 9 seals the fiber/film assembly against environmental degradation, and is formed of a material with sufficiently high index of refraction to assure that light passing through the metal film is coupled out and scattered. While illustrated as a block, plate 9 may be a sputtered or deposited coating, a cover slip such as a thin silica sheet, or a birefringement crystal. In the latter case, the efficiency with which light is coupled out of the film may be optimized by rotating the birefringent crystal to an orientation between two birefringence axes having indices of refraction $n_i$, $n_j$, to obtain an index $n_{out}$ along the direction of propagation having an intermediate value selected to assure that light propagating into the film escapes. Unwanted absorption may be reduced by optimizing the boundary conditions in this manner.

Figure 3:
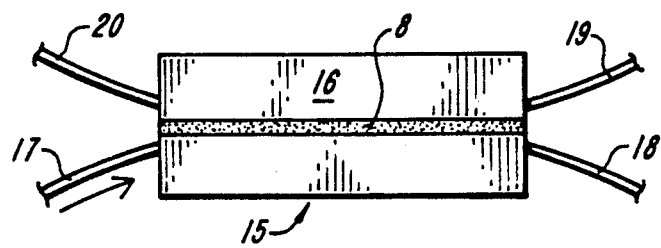
FIG. 3 shows a polarization beamsplitter in accordance with another embodiment of the invention.

In addition to the fabrication of a basic polarizer, the invention contemplates the construction of polarization couplers and polarization beamsplitters incorporating the prepared metal clad assembly of FIG. 1C. An Indium-bonded polarizing, or polarization beam splitting coupler 15 is illustrated in FIG. 3. In this embodiment, a second lapped half-coupler 16 with a second fiber 20 is prepared essentially identically to the lapped assembly of FIG. 1B, but not necessarily coated, and is placed over and aligned with an Indium-coated half-coupler of the type shown in FIG. 1C. The two assemblies are pressed together so that the Indium wets to the assemblies and bonds both halves together. Slight shear or vibrational energy may be applied to initiate or enhance the Indium film wetting to the second block, and heat may be applied to melt the Indium layer. The completed coupler has its metal polarizing layer encased and protected from the environment. Moreover, the layer is thin enough so that it does not introduce significant thermal-coefficient mechanical perturbations.

In this construction, the second fiber is aligned with its lapped region over the lapped region of the first fiber, so that when light of one polarization is coupled out of the first fiber it enters the second fiber. Thus, light entering at port 17 is split into two orthogonal polarizations which pass to the respective output ports 18, 19. With this embodiment, the coupler may function as a polarization beamsplitter in which the coupling ratio is a strong function of the guided wave polarization. Launching the input light into fiber end 17 at a 45° angle to the two birefringence axes results in a 50/50 partition of the light into polarized outputs which appear at fibers 18, 19.

Figure 5B:
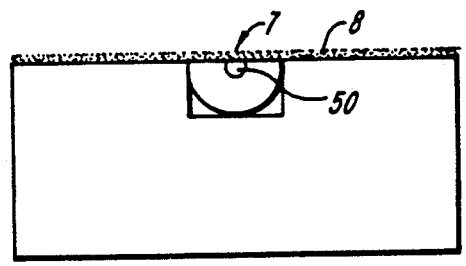

FIG. 5B illustrates a section along lines similar to those of FIG. 5A, of another embodiment of the invention. In this case, the metallized film 8 is placed on a surface 7 which is lapped slightly into the core 50. This construction results in a cut-off polarizer.

Figure 5C:
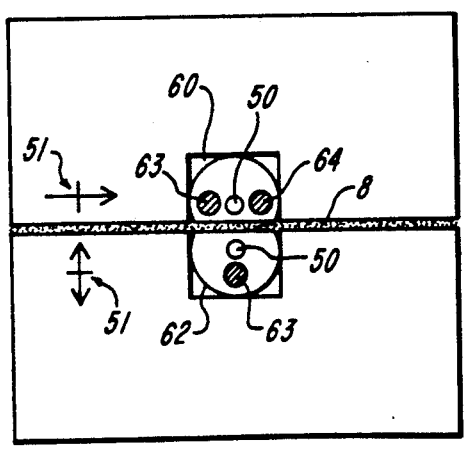

FIG. 5C shows a vertical section through one embodiment of a coupler as shown in FIG. 3. In this embodiment, each of the two fibers 60, 62 are illustrated as having a core which is rendered birefringement by virtue of being located in an anisotropically-stressed region defined by two stress bodies 63, 64 extending axially along opposite sides of the core. The stress bodies define a first axis parallel to the line through the two bodies, and a second axis perpendicular to the first axis. As indicated by the birefringence axis diagrams appearing at the left side of each block, in this embodiment, the first axis of one fiber is aligned parallel to the metallized film surface, while the second axis of the other fiber is parallel to the surface, forming a unique polarizing coupler.

Figure 4:
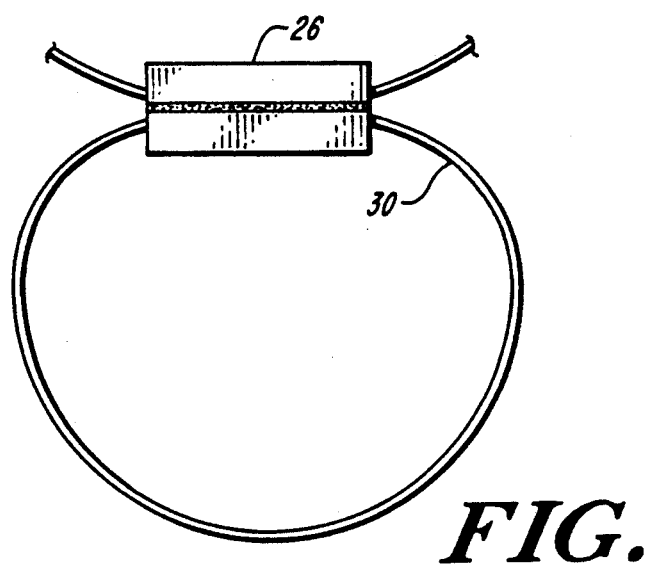
FIGS. 4, 4A show a single channel resonant fiber ring fabricated in accordance with other embodiments of the invention.

FIG. 4 shows another embodiment of the invention, wherein an Indium-bonded polarizing coupler 26 couples to a resonant fiber optic ring 30, which may be either spliced from components, or a spliceless assembly formed on a single fiber strand. In the latter case the fiber loop is formed of a portion of fiber lying between the ends of a fiber carried by the blocks.

The construction of FIG. 4 provides a single eigenmode in the ring, eliminating the troublesome orthogonal polarization dip at resonance and the resulting drift. This is achieved without the use of single polarization fiber or of a separate polarizer in the ring. The construction is analogous to a fiber ring with a single fiber splice, but avoids the drawbacks of loss, back reflection and polarization cross coupling which occur in spliced ring constructions.

Figure 4A:
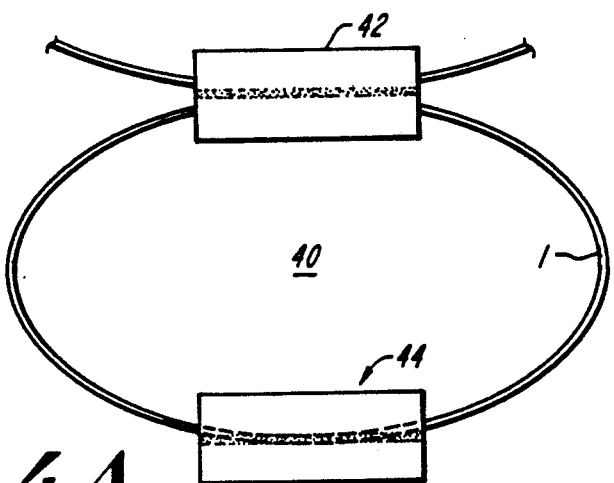

FIG. 4A shows a related construction. In this embodiment, a ring 40 is formed from a coupler 42, which may be a normal or an Indium-bonded coupler of the type shown in FIG. 3. In addition, the fiber 1 constituting the ring has fabricated on a portion thereof, a polarizer 44 of the type illustrated in FIG. 2. Polarizer 44 selectively attenuates light of one polarization, so that ring 40 is susceptible to resonance in a single polarization mode, namely the mode which is not coupled out of the ring by polarizer 44.

In all of the above described constructions, the Indium film serves both as a polarization-selective element and as bonding agent. The Indium becomes the coupling medium, and also hermetically seals the coupling region. Since Indium is highly compliant and is wettable to $SiO_2$, it can fill voids and small imperfections of a magnitude that would impair other types of couplers, such as optically-contacted couplers.

The latter property permits the polarizing coupler half-blocks to be fabricated to looser tolerances. Further, even after assembly, slight adjustments in coupling ratio may be effected by heating the assembly above the meltinq point and laterally adjusting one coupler half with respect to the other.

The ring of FIG. 4 may be taken as representative of diverse sensors or instruments wherein a single mode fiber acts as sensing or signal conditioning element for light traveling therein. In addition to the illustrated embodiments, the invention is broadly applicable to fiber sensors and optical communications instrumentation. Polarization beamsplitter embodiments may find direct applications in coherent light communications system. Other variations, modifications and adaptations will suggest themselves to those skilled in the art, and are considered to lie within the scope of the invention, as defined by the claims appended hereto.

What is claimed is:

1. A fiber optic coupler comprising
   a first polarization maintaining (PM) fiber mounted in a coupling block and lapped to expose a first coupling surface near its core,
   a second PM fiber mounted in a coupling block and lapping to expose a second coupling surface near its core,
   wherein at least one of said first and second coupling surfaces is coated with a layer of Indium and said surfaces are opposed and contacted such that the Indium bonds the surfaces to each other to provide optical coupling between said first and second PM fibers through said layer.

2. A fiber optic coupler according to claim 1, wherein a said coupling surface is covered with a layer of Indium between approximately 0.005 and 0.05 micrometers thick.

3. A fiber optic coupler according to claim 1, which is a polarization selective coupler.

4. A fiber optic coupler according to claim 1, which is a polarizing coupler.

5. A fiber optic coupler according to claim 1, which couples polarized light in a fiber ring.

6. A polarization element comprising
   a polarization maintaining (PM) optical fiber mounted in a first block and lapped to expose a fiber coupling surface proximate to the core of the fiber,
   an Indium film formed on said fiber coupling surface in the thickness to selectively affect light one polarity, and
   a cover plate over said fiber coupling surface, said cover plate having a refractive index selected for coupling light of out of the Indium film, the Indium film bonding the cover plate to the exposed fiber surface thereby sealing the polarization element.

7. A polarization element according to claim 6, wherein said cover plate is formed of a birefringent material and is rotated to optimize local refractive index, forming a polarizer.

8. A polarization element according to claim 6, wherein a fiber is mounted in said cover plate and is lapped to expose a coupling region of the fiber that is placed in contact with the Indium film on said coupling surface, such that said element couples polarized light in a fiber ring.

9. A polarization element according to claim 6, which selectively couples out light of one polarization.

10. A polarization element according to claim 8, which is an inertial sensor and wherein the PM optical fiber mounted in the first block constitutes an input or output light path for a fiber ring carried by the element.

11. A polarization element according to claim 10, which selectively couples light of one polarization from the ring.

12. A polarization element according to claim 8, wherein the fiber ring is a portion of the PM optical fiber mounted in the first block.

* * * * *